US012313997B2

(12) United States Patent
Shimohora

(10) Patent No.: US 12,313,997 B2
(45) Date of Patent: May 27, 2025

(54) IMAGE FORMING APPARATUS

(71) Applicant: KYOCERA Document Solutions Inc., Osaka (JP)

(72) Inventor: Yuya Shimohora, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/659,658

(22) Filed: May 9, 2024

(65) Prior Publication Data

US 2024/0385562 A1 Nov. 21, 2024

(30) Foreign Application Priority Data

May 15, 2023 (JP) ................................ 2023-080335

(51) Int. Cl.
*G03G 15/00* (2006.01)

(52) U.S. Cl.
CPC ..... *G03G 15/6561* (2013.01); *G03G 15/6567* (2013.01); *G03G 2215/00561* (2013.01); *G03G 2215/00616* (2013.01); *G03G 2215/00721* (2013.01)

(58) Field of Classification Search
CPC ........... G03G 15/6561; G03G 15/6567; G03G 2215/00561; G03G 2215/00616; G03G 2215/00721
See application file for complete search history.

(56) References Cited

U.S. PATENT DOCUMENTS 5,794,176 A * 8/1998 Milillo ...................... G06T 3/02 271/228
2008/0003031 A1 1/2008 Tsuchiya et al. ............. 399/361
2008/0199196 A1 * 8/2008 Cook ................. G03G 15/6564 399/66
2009/0059249 A1 * 3/2009 Izumiya ............. H04N 1/00002 358/1.9
2017/0235269 A1 * 8/2017 Deno ..................... B65H 9/103 271/225

FOREIGN PATENT DOCUMENTS

JP 2008-24507 A 2/2008

* cited by examiner

*Primary Examiner* — David H Banh
(74) *Attorney, Agent, or Firm* — Stein IP, LLC

(57) ABSTRACT

An image forming apparatus includes a pair of registration rollers, an image formation unit, a roller movement mechanism, a detection unit and a control unit which performs a displacement correction for moving the pair of registration rollers from a home position. The control unit determines tendency information indicating the tendency of a displacement direction and a displacement amount of a sheet, the control unit displaces the home position in a direction opposite to the displacement direction indicated by the tendency information only by the displacement amount indicated by the tendency information and the control unit displaces the writing start position of an electrostatic latent image in a main scanning direction in the displacement direction indicated by the tendency information only by the displacement amount indicated by the tendency information.

4 Claims, 7 Drawing Sheets

IMAGE FORMING APPARATUS

INCORPORATION BY REFERENCE

This application is based upon and claims the benefit of priority from the corresponding Japanese Patent Application No. 2023-080335 (filed on May 15, 2023), the entire contents of which are incorporated herein by reference.

BACKGROUND

The present disclosure relates to image forming apparatuses.

Conventionally, an image forming apparatus conveys a sheet, and prints an image on the sheet which is being conveyed. When a sheet which is being conveyed is displaced in a width direction, the print position of the image on the sheet is displaced in the width direction.

SUMMARY

An image forming apparatus according to an aspect of the present disclosure includes a pair of registration rollers, an image formation unit, a roller movement mechanism, a detection unit and a control unit. The pair of registration rollers can be moved in a width direction orthogonal to a sheet conveyance direction, are rotatably supported, are pressed against each other in a registration position, are moved in the width direction to reach a predetermined home position before a sheet reaches the registration position and nip the sheet which has reached the registration position and rotate to covey the sheet. The image formation unit performs scanning exposure on a member to be exposed to form an electrostatic latent image on the member to be exposed, thereafter develops the electrostatic latent image into a toner image and transfers the toner image to the sheet in a transfer position on a downstream side in the sheet conveyance direction relative to the registration position. The roller movement mechanism moves the pair of registration rollers in the width direction. The detection unit detects the position of the sheet in the width direction in a detection position between the registration position and the transfer position in the sheet conveyance direction. The control unit individually performs a displacement correction on the sheet, and the displacement correction is performed by determining, before a target sheet which is the sheet nipped by the pair of registration rollers reaches the transfer position, based on position data of the target sheet obtained by the detection performed by the detection unit, a displacement direction and a displacement amount relative to a target position of the target sheet in the width direction as displacement information, and moving, from the home position, the pair of registration rollers in a direction opposite to the displacement direction indicated by the displacement information only by the displacement amount indicated by the displacement information. The control unit determines, based on pieces of the displacement information of a predetermined number of the sheets that have been passed through the registration position, tendency information indicating a tendency of the displacement direction and the displacement amount relative to the target position of the sheet in the width direction, and performs at least one of first processing and second processing based on the tendency information. The control unit displaces, as the first processing, the home position from a position before the performance of the first processing in a direction opposite to the displacement direction indicated by the tendency information only by the displacement amount indicated by the tendency information. The control unit displaces, as the second processing, the writing start position of the electrostatic latent image in a main scanning direction from a position before the performance of the second processing in the displacement direction indicated by the tendency information only by the displacement amount indicated by the tendency information.

DETAILED DESCRIPTION

An image forming apparatus according to an embodiment of the present disclosure will be described below using a monochrome laser printer as an example. However, the image forming apparatus which can be applied to the present disclosure is not limited to a monochrome laser printer. The present disclosure can also be applied to, for example, a tandem-type color laser printer. The image forming apparatus may have not only a print function but also a copy function and the like.

<Overall Configuration of Image Forming Apparatus>

Figure 1:
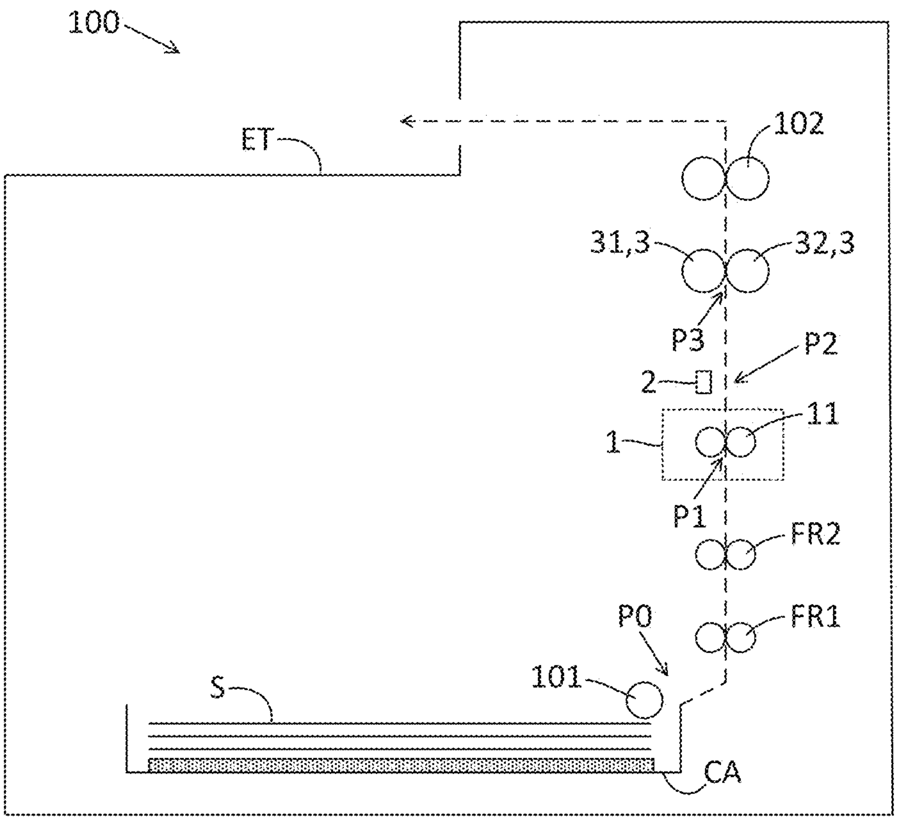
FIG. 1 is a schematic view of an image forming apparatus according to an embodiment.

As shown in FIG. 1, the image forming apparatus 100 of the present embodiment includes a sheet conveyance path (reference sign is omitted). In FIG. 1, the sheet conveyance path is indicated by a dashed line with an arrow.

The image forming apparatus 100 performs a print job which prints an image on a sheet S being conveyed and ejects the sheet S. Specifically, the image forming apparatus 100 conveys the sheet S along the sheet conveyance path. The image forming apparatus 100 uses an electrophotographic system to print the image on the sheet S being conveyed. In other words, the image forming apparatus 100 transfers a toner image to the sheet S being conveyed. Then, the image forming apparatus 100 ejects the printed sheet S to an ejection tray ET.

In the following description, the conveyance direction of the sheet S which is conveyed along the sheet conveyance path is simply referred to as a “sheet conveyance direction”. A direction orthogonal to the sheet conveyance direction is referred to as a “width direction”.

The image forming apparatus 100 includes a paper feed unit 101 and a fixing unit 102. The paper feed unit 101 is arranged in a paper feed position P0. The paper feed unit 101 feeds the sheet S from a paper feed cassette CA to the sheet conveyance path. The fixing unit 102 performs fixing processing in a position on a downstream side in the sheet conveyance direction relative to a transfer position P3 which will be described later. The fixing unit 102 performs the fixing processing to fix, to the sheet S. the toner image transferred to the sheet S. The sheet S after the fixing processing is ejected to the ejection tray ET.

The image forming apparatus 100 includes a registration unit 1, a reading unit 2 and an image formation unit 3. The registration unit 1 coveys the sheet S in a registration position P1. The reading unit 2 reads the sheet S in a reading position P2. The image formation unit 3 transfers the toner image to the sheet S in the transfer position P3. The sheet conveyance path passes through the registration position P1, the reading position P2 and the transfer position P3 in this order. In this configuration, the reading position P2 is located between the registration position P1 and the transfer position P3 in the sheet conveyance direction. The reading unit 2 corresponds to a "detection unit", and the reading position P2 corresponds to a "detection position".

For example, a first conveyance roller pair FR1 and a second conveyance roller pair FR2 are provided in this order between the paper feed position P0 and the registration position P1 in the sheet conveyance direction from an upstream side to the downstream side in the sheet conveyance direction. Each of the first conveyance roller pair FR1 and the second conveyance roller pair FR2 is rotatably supported, and includes a pair of conveyance rollers which are pressed against each other. In each of the first conveyance roller pair FR1 and the second conveyance roller pair FR2, the sheet S is nipped between the corresponding pair of conveyance rollers, and the sheet S is conveyed by its rotation in this state. In other words, each of the first conveyance roller pair FR1 and the second conveyance roller pair FR2 makes contact with the sheet S to rotate in a position on the upstream side in the sheet conveyance direction relative to the registration position P1 so as to convey the sheet S toward the registration position P1. In this configuration, the first conveyance roller pair FR1 and the second conveyance roller pair FR2 correspond to an "upstream-side roller member". Although not shown in the figure, one conveyance roller of the pair of conveyance rollers is rotated by the transmission of a driving force from a conveyance motor. The other conveyance roller follows the one conveyance roller to rotate.

While a displacement correction which will be described later is being performed, the first conveyance roller pair FR1 accelerates rotation. On the other hand, while the displacement correction is being performed, the second conveyance roller pair FR2 separates the pair of conveyance rollers from each other. In other words, while the displacement correction is being performed, the second conveyance roller pair FR2 does not nip the sheet S (that is, does not convey the sheet S). In order to perform the control described above, a motor (not shown) which moves one conveyance roller of the second conveyance roller pair FR2 in a direction away from the other conveyance roller or a direction approaching the other conveyance roller is coupled to the second conveyance roller pair FR2.

The registration unit 1 includes a pair of registration rollers 11 which are rotatably supported. The pair of registration rollers 11 are formed with a pair of registration rollers which are pressed against each other in the registration position P1. In other words, in the registration position P1, the pair of registration rollers are pressed against each other to form a registration nip. One registration roller is rotated by the transmission of a driving force from a registration motor M1 (see FIG. 5). The other registration roller follows the one registration roller to rotate.

The pair of registration rollers 11 nip the sheet S which has reached the registration position P1. The sheet S is conveyed toward the registration position P1 by the first conveyance roller pair FR1 and the second conveyance roller pair FR2. In this way, the sheet S reaches the registration position P1, makes contact with the registration nip and enters the registration nip. The pair of registration rollers 11 nip the sheet S and rotate to convey the sheet S toward the reading position P2 and the transfer position P3.

When the sheet S reaches the registration position P1, the rotation of the pair of registration rollers 11 is stopped. On the other hand, at this point, the first conveyance roller pair FR1 and the second conveyance roller pair FR2 which convey the sheet S on the upstream side in the sheet conveyance direction relative to the registration position P1 are rotated. After the sheet S reaches the registration position P1, the rotation of the first conveyance roller pair FR1 and the second conveyance roller pair FR2 is stopped. In this way, even when the sheet S which has reached the registration position P1 skews, the skew thereof is corrected. Here, a warp is formed in the sheet S. When a time elapsed after the sheet S reaches the registration position P1 reaches a predetermined warp formation time, the rotation of the first conveyance roller pair FR1 and the second conveyance roller pair FR2 is stopped. Although details will be described later, the warp formation time can be changed.

Figure 2:
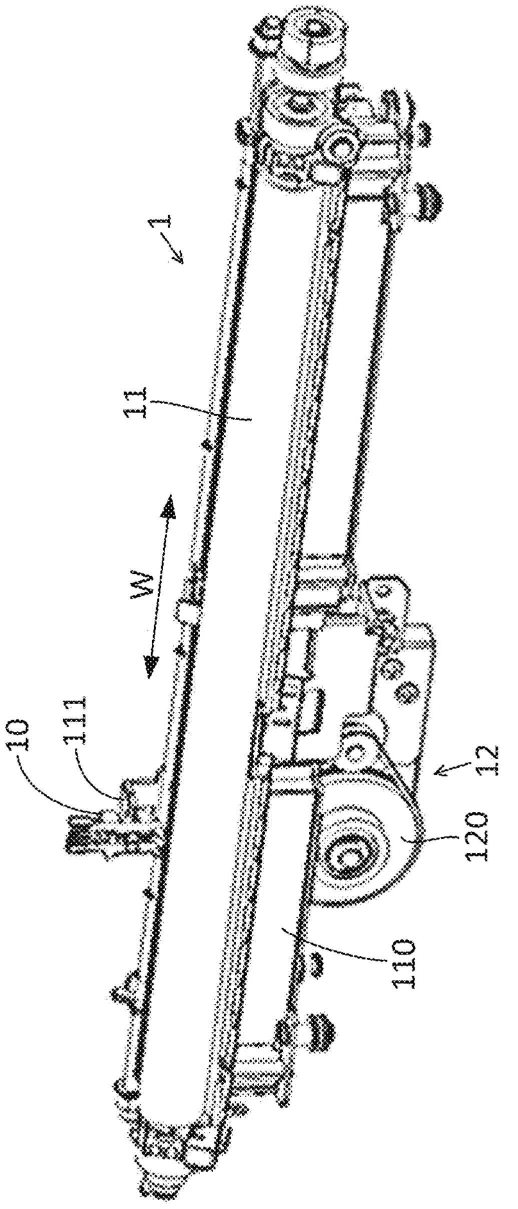
FIG. 2 is a perspective view when a registration unit in the embodiment is viewed from one side in a direction orthogonal to a roller shaft direction.
Figure 3:
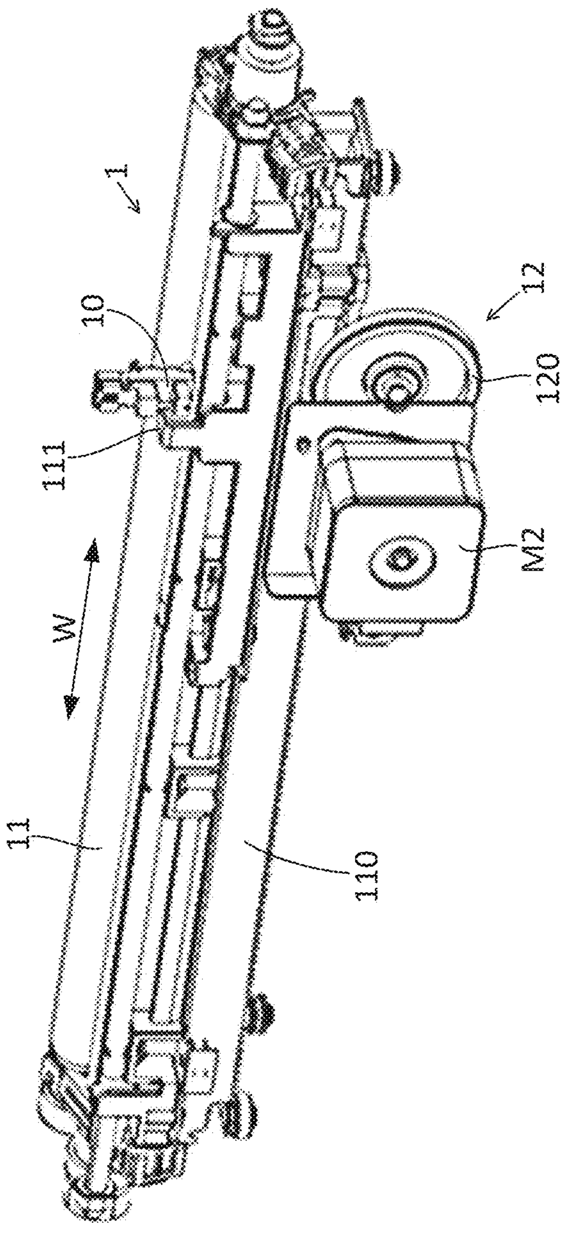
FIG. 3 is a perspective view when the registration unit in the embodiment is viewed from the other side (side opposite to FIG. 2) in the direction orthogonal to the roller shaft direction.

As shown in FIGS. 2 and 3, the registration unit 1 includes a roller movement mechanism 12. In FIGS. 2 and 3, the direction of arrows indicated by a reference sign W is the width direction. The roller movement mechanism 12 moves the pair of registration rollers 11 in the width direction (that is, in the direction in which the rotation shafts of the pair of registration rollers 11 extend). In other words, the pair of registration rollers 11 can be moved in the width direction. For example, the pair of registration rollers 11 are supported by a carriage 110. The roller movement mechanism 12 moves the carriage 110 in the width direction.

The roller movement mechanism 12 includes a correction motor M2. The correction motor M2 is coupled to the carriage 110 via a transmission mechanism 120 which includes a gear, a timing belt, a rack and a pinion and the like. For example, a rack is provided in the carriage 110. The transmission mechanism 120 converts the rotational motion of the output shaft of the correction motor M2 into a linear motion. The correction motor M2 is driven, and thus the carriage 110 (that is, the pair of registration rollers 11) is moved in the width direction.

The correction motor M2 is a stepping motor. The correction motor M2 can be rotated in both forward and reverse directions. In other words, the pair of registration rollers 11 can be moved in one direction of the width direction and in the other direction opposite to the one direction.

Before the sheet S reaches the registration position P1, the pair of registration rollers 11 are moved in the width direction to reach a predetermined home position. The pair of registration rollers 11 receive the sheet S in a state where the position in the width direction is moved to the home position. In order to cause the pair of registration rollers 11 to reach the home position, the registration unit 1 includes a home position sensor 10. In the carriage 110, a detection piece 111 is provided which is moved in the width direction together with the carriage 110.

The home position sensor 10 is a transmissive optical sensor which includes a light emitting portion and a light receiving portion. The home position sensor 10 includes, as a detection region, a region between the light emitting portion and the light receiving portion (that is, the optical path of the optical sensor). The detection region of the home position sensor 10 is arranged on the movement path of the detection piece 111. Hence, the detection piece 111 is a detection target for the home position sensor 10. When the detection piece 111 is present in the detection region of the home position sensor 10, the optical path of the home position sensor 10 is blocked. In this way, the home position sensor 10 changes its output according to whether the detection piece 111 is present in the detection region.

For example, when the correction motor M2 is rotated in one direction, and thus the pair of registration rollers 11 reach the end of one side of a predetermined movable range in the width direction, the output value of the home position sensor 10 is changed to a value indicating that the detection piece 111 is detected. Then, after the output value of the home position sensor 10 is changed to the value indicating that the detection piece 111 is detected, when the correction motor M2 is rotated in the other direction by an angle corresponding to a predetermined reference pulse, the position of the pair of registration rollers 11 in the width direction is the home position. In other words, when in a state where the pair of registration rollers 11 reach the end of one side of the movable range in the width direction, the pair of registration rollers 11 are moved to the other side in the width direction by a reference distance (that is, a distance corresponding to the reference pulse), the position of the pair of registration rollers 11 in the width direction is the home position. Although details will be described later, the reference pulse (that is, the reference distance) can be corrected. In other words, the home position can be corrected.

Since the reading unit 2 is arranged in a position shown in FIG. 1, the reading unit 2 reads the sheet S in a state where the sheet S is nipped by the pair of registration rollers 11. The reading unit 2 is a CIS (Contact Image Sensor) unit. The reading unit 2 reads the sheet S in the reading position P2, and generates image data for the read sheet S.

The reading unit 2 includes a line sensor which is not shown. The line sensor includes a plurality of pixels aligned in a main scanning direction (that is, the width direction). The line sensor is arranged in a position which overlaps the edge of the sheet S in the width direction regardless of the size of the sheet S.

In the image forming apparatus 100, center paper feeding is performed. In other words, ideally, the center of the sheet conveyance path in the width direction coincides with the center of the sheet S being conveyed along the sheet conveyance path. Hence, when the sheet S is not displaced in the width direction while the sheet S is being conveyed, a position through which the edge of the sheet S in the width direction is passed is determined. In other words, which pixel among the pixels of the line sensor reads the edge of the sheet S in the width direction is determined.

Thus, the image data for the sheet S obtained by the reading of the sheet S performed by the reading unit 2 can be used as position data for detecting the position of the sheet S in the width direction. In other words, the reading unit 2 detects the position of the sheet S in the width direction in the detection position (that is, the reading position P2) to generate the position data (that is, the image data for the sheet S) for the sheet S.

The image formation unit 3 includes a photosensitive drum 31 and a transfer roller 32. The rotation shafts of the photosensitive drum 31 and the transfer roller 32 extend in the width direction. The photosensitive drum 31 and the transfer roller 32 are pressed against each other in the transfer position P3. The photosensitive drum 31 and the transfer roller 32 are pressed against each other, and thus a transfer nip is formed in the transfer position P3.

The image formation unit 3 includes a charging device and a development device which are not shown in the figure. The image formation unit 3 further includes an exposure device 33 (see FIG. 4).

The charging device charges the circumferential surface of the photosensitive drum 31. The exposure device 33 forms an electrostatic latent image on the circumferential surface of the photosensitive drum 31. The development device develops the electrostatic latent image on the circumferential surface of the photosensitive drum 31 into a toner image. The transfer roller 32 nips the sheet S between the circumferential surface of the photosensitive drum 31 and the transfer roller 32, and is rotated together with the photosensitive drum 31 to convey the sheet S. Here, the toner image on the circumferential surface of the photosensitive drum 31 is transferred to the sheet S.

In other words, the image formation unit 3 performs scanning exposure on the photosensitive drum 31 to form the electrostatic latent image, thereafter develops the electrostatic latent image into the toner image and transfers the toner image to the sheet S in the transfer position P3. In this configuration, the photosensitive drum 31 corresponds to a "member to be exposed".

Figure 4:
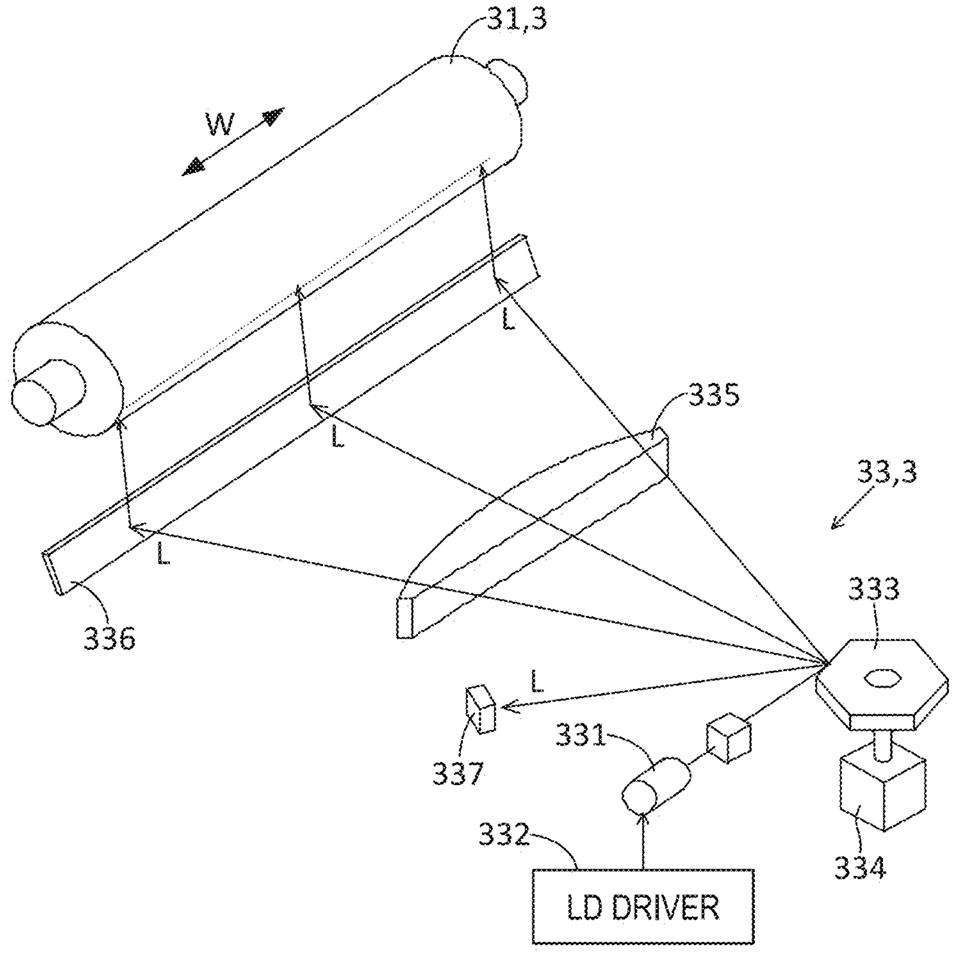
FIG. 4 is a schematic view of an exposure device in the embodiment.

The exposure device 33 has, for example, a configuration as shown in FIG. 4. The configuration of the exposure device 33 shown in FIG. 4 is an example, and the present disclosure is not limited to this configuration. In FIG. 4, the direction of arrows indicated by a reference sign W is the width direction, and is also the main scanning direction.

The exposure device 33 includes a semiconductor laser element 331, an LD driver 332, a polygon mirror 333, a polygon motor 334, an Fθ lens 335, a reflection mirror 336 and a light beam detection unit 337. The exposure device 33 uses a light beam (indicated by an arrow L in FIG. 4) emitted from the semiconductor laser element 331 with the direction of the rotation shaft of the semiconductor laser element 331 (that is, the width direction indicated by the arrows W) set to the main scanning direction, and thereby performs the scanning exposure on the circumferential surface of the photosensitive drum 31. In this way, the exposure device 33 forms the electrostatic latent image on the circumferential surface of the photosensitive drum 31.

The semiconductor laser element 331 emits the light beam by the supply of power from the LD driver 332. The light beam emitted from the semiconductor laser element 331 enters the mirror surface (that is, the side surface) of the polygon mirror 333. Here, the polygon mirror 333 is rotated by the transmission of a driving force from the polygon motor 334. Hence, the light beam which has entered the polygon mirror 333 is reflected and deflected by the polygon mirror 333.

The light beam reflected off the polygon mirror 333 enters the Fθ lens 335. The Fθ lens 335 guides the light beam to the reflection mirror 336. Then, the reflection mirror 336 reflects the light beam to the photosensitive drum 31. In this way, the exposure device 33 performs the scanning exposure on the circumferential surface of the photosensitive drum 31.

The light beam detection unit 337 is arranged in a region that is within a range to which the light beam reflected off the polygon mirror 333 can be applied and that is outside the range of the scanning exposure on the circumferential surface of the photosensitive drum 31. The light beam detection unit 337 detects the light beam. When the electrostatic latent image is formed on the circumferential surface of the photosensitive drum 31, writing of each main scanning line for the electrostatic latent image is started with timing at which a predetermined reference time has elapsed after the detection of the light beam by the light beam detection unit 337. In this configuration, based on the reference time, the writing start position of the electrostatic latent image in the main scanning direction is determined. Although details will be described later, the reference time can be corrected. In other words, the writing start position of the electrostatic latent image in the main scanning direction can be corrected.

Figure 5:
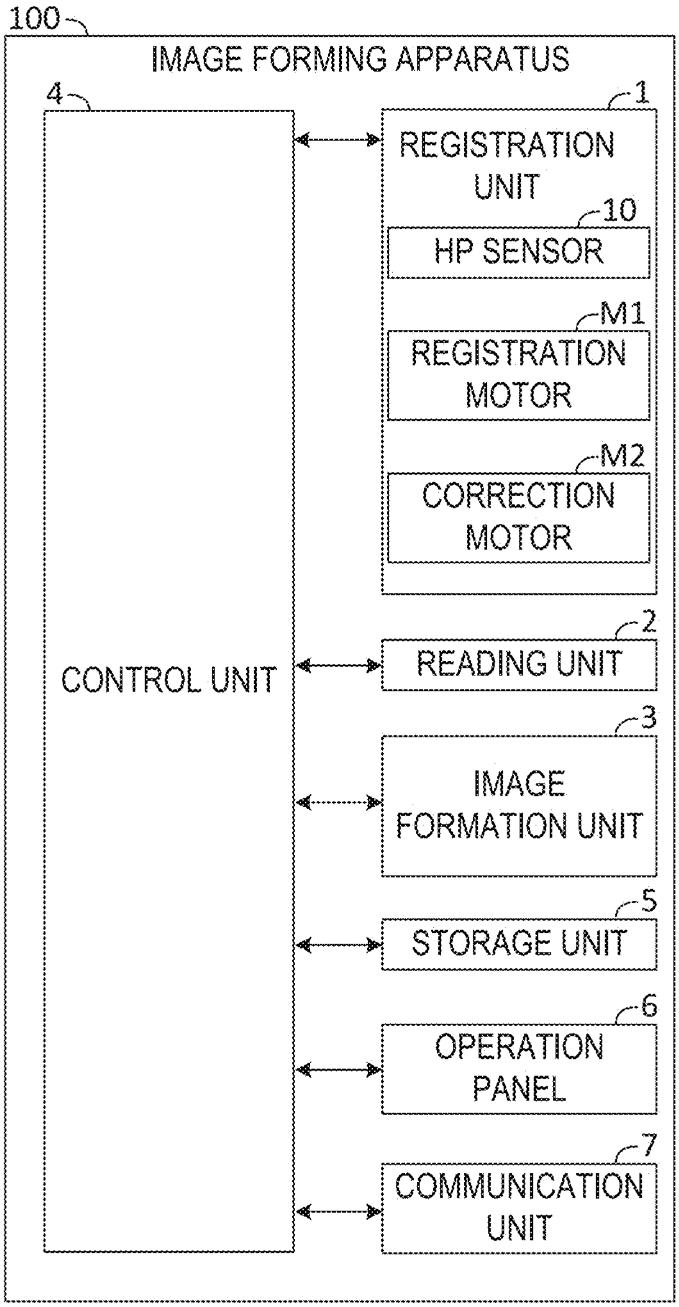
FIG. 5 is a block diagram of the image forming apparatus according to the embodiment.

As shown in FIG. 5, the image forming apparatus 100 includes a control unit 4 and a storage unit 5. The control unit 4 includes processing circuits such as a CPU and an ASIC. The control unit 4 includes memories such as a ROM and a RAM. The storage unit 5 includes nonvolatile storage devices such as a ROM and a HDD.

The control unit 4 controls conveyance processing on the sheet S which is performed by the registration unit 1. In other words, the control unit 4 controls the registration motor M1. The control unit 4 properly switches between the rotation of the pair of registration rollers 11 and the stop of the rotation thereof.

In order to control the conveyance processing on the sheet S performed by the registration unit 1, a conveyance sensor (not shown) is connected to the control unit 4. In the conveyance sensor, a position on the upstream side in the sheet conveyance direction relative to the registration position P1 is set to the detection position, and an output value is changed according to whether the sheet S is present in the detection position. The control unit 4 determines whether the sheet S reaches the registration position P1 based on a time elapsed after the sheet S reaches the detection position of the conveyance sensor.

When the sheet S reaches the registration position P1, the control unit 4 maintains a state where the rotation of the pair of registration rollers 11 is stopped, and when the predetermined warp formation time has elapsed after the sheet S reaches the registration position P1, the control unit 4 stops the rotation of the first conveyance roller pair FR1 and the second conveyance roller pair FR2. After a warp is formed in the sheet S which has reached the registration position P1, the control unit 4 starts the conveyance of the sheet S from the registration position P1. The control unit 4 stops the rotation of the pair of registration rollers 11 after the back end of the sheet S passes through the registration position P1 until the subsequent sheet S reaches the registration position P1.

Although details will be described later, the control unit 4 individually performs the displacement correction for the sheet S. In the displacement correction for the sheet S, the position of the pair of registration rollers 11 in the width direction is displaced from the home position. Hence, the control unit 4 performs processing for returning the pair of registration rollers 11 to the home position after the back end of the sheet S passes through the registration position P1 until the subsequent sheet S reaches the registration position P1. Here, the control unit 4 rotates the correction motor M2 in one direction (in other words, moves the pair of registration rollers 11 to one side in the width direction) until the home position sensor 10 (in FIG. 5, the HP sensor 10) detects the detection piece 111. Thereafter, the control unit 4 rotates the correction motor M2 in the other direction only by an angle corresponding to the reference pulse, and stops the rotation of the correction motor M2 (in other words, moves the pair of registration rollers 11 to the other side in the width direction only by the reference distance, and causes the pair of registration rollers 11 to stand still).

The control unit 4 controls reading processing on the sheet S which is performed by the reading unit 2. The control unit 4 acquires the image data for the sheet S obtained by the reading performed by the reading unit 2. The control unit 4 determines, based on the image data for the sheet S, as displacement information, a displacement direction and a displacement amount relative to the target position of the sheet S in the width direction which is read by the reading unit 2 and is being conveyed. The edge position (that is, the ideal position) of the sheet S in the width direction when the sheet S is not displaced is the target position.

When the control unit 4 determines the displacement information, the control unit 4 references target position information which is previously stored in the storage unit 5. The target position information is information in which the edge position of the sheet S in the width direction when the sheet S is not displaced is defined for the size of the sheet S.

The control unit 4 recognizes the size of the sheet S which is read by the reading unit 2 and is being conveyed. The control unit 4 detects edge pixels corresponding to the edges of the sheet S in the width direction in the image data for the sheet S which is read by the reading unit 2 and is being conveyed. The edge pixels are pixels which form the outline of the sheet S and in which a density difference between pixels adjacent in the main scanning direction is equal to or greater than a predetermined value. The control unit 4 detects the edge pixels which are present at the ends in the main scanning direction. The control unit 4 performs processing for determining in which direction and how many pixels the detected edge pixels are displaced relative to the target position corresponding to the size of the sheet S which is read by the reading unit 2 and is being conveyed.

The control unit 4 performs the processing described above to determine the displacement information. The control unit 4 corrects, based on the displacement information, a displacement of the sheet S in the width direction which is read by the reading unit 2 and is being conveyed. The control unit 4 individually determines the displacement information for the sheet S, and stores the displacement information in the storage unit 5. The control unit 4 individually performs the displacement correction for the sheet S. The displacement correction for the sheet S will be described in detail later.

Based on the image data for the sheet S which is read by the reading unit 2 and is being conveyed, the control unit 4 determines the amount of skew of the sheet S (how much the sheet S skews). When the amount of skew of the sheet S is determined, the control unit 4 recognizes, in the image data for the sheet S which is read by the reading unit 2 and is being conveyed, a displacement direction and a displacement amount (here, referred to as “front end displacement information”) of a front end edge pixel which is an edge pixel of the sheet S at the front end in the main scanning direction relative to the target position, and a displacement direction and a displacement amount (here, referred to as “back end displacement information”) of a back end edge pixel which is an edge pixel of the sheet S at the back end in the main scanning direction relative to the target position. Then, the control unit 4 determines, based on the front end displacement information and the back end displacement information, the amount of skew of the sheet S which is read by the reading unit 2 and is being conveyed. The control unit 4 individually determines the amount of skew of the sheet S, and stores it in the storage unit 5. For example, the control unit 4 determines, as the amount of skew, a distance between the front end edge pixel and the back end edge pixel in the main scanning direction (distance corresponding to the number of pixels).

The control unit 4 controls transfer processing for the toner image to the sheet S which is performed by the image formation unit 3. As part of the transfer processing, the control unit 4 performs processing for measuring timing at which writing of the electrostatic latent image on the circumferential surface of the photosensitive drum 31 is started. In other words, the control unit 4 controls the writing start position of the electrostatic latent image in the main scanning direction. The control unit 4 starts the writing of each main scanning line for the electrostatic latent image with timing at which the reference time has elapsed after the detection of the light beam performed by the light beam detection unit 337.

The control unit 4 also controls the paper feed unit 101 and the fixing unit 102. The control unit 4 also controls the first conveyance roller pair FR1 and the second conveyance roller pair FR2. In other words, the control unit 4 controls various motors coupled to the first conveyance roller pair FR1 and the second conveyance roller pair FR2.

The image forming apparatus 100 includes an operation panel 6. The operation panel 6 includes a touch screen. The operation panel 6 displays a software button, a message and the like on the touch screen. In the operation panel 6, a hardware button is also provided. The operation panel 6 receives an operation from a user. The user can make various settings such as a job setting via the operation panel 6.

The control unit 4 controls the display operation of the operation panel 6. The control unit 4 detects an operation performed on the operation panel 6. The control unit 4 makes the job setting based on an operation received by the operation panel 6 from the user.

The image forming apparatus 100 includes a communication unit 7. The communication unit 7 includes a communication circuit and the like. The communication unit 7 is connected to a user terminal (not shown) such as a personal computer via a network. The control unit 4 uses the communication unit 7 to communicate with the user terminal.

Print data for a print job (data including PDL data and the like) is transmitted from the user terminal to the image forming apparatus 100. In other words, a request for performing a print job is transmitted from the user terminal to the image forming apparatus 100. The print data for a print job includes various types of setting data on printing such as the size of the sheet S used in the print job.

<Displacement Correction for Sheet>

The flow of the displacement correction for the sheet S will be described below with reference to a flowchart shown in FIG. 6. In the displacement correction, a displacement of the sheet S in the width direction is corrected.

Figure 6:
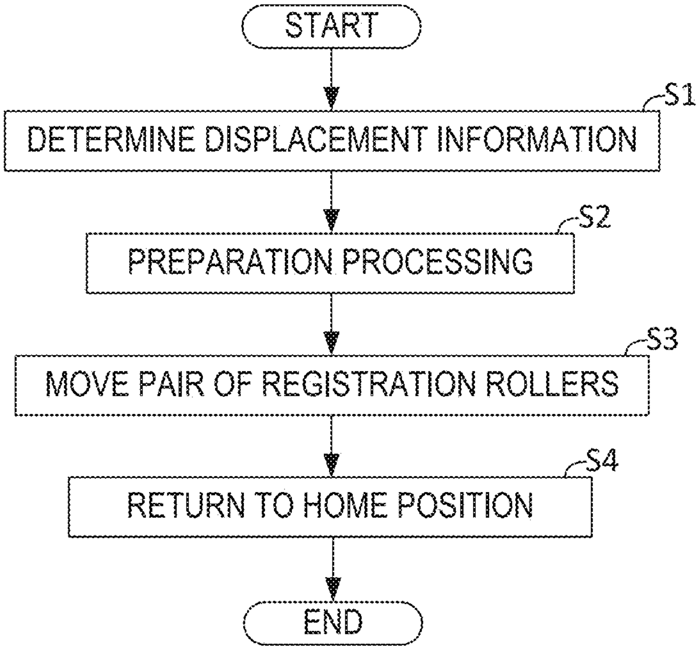
FIG. 6 a flowchart showing the flow of a displacement correction which is performed by a control unit in the embodiment.

The start of the flow shown in FIG. 6 is when the front end part of the sheet S being conveyed is read by the reading unit 2. Here, the position of the pair of registration rollers 11 in the width direction is the home position. Here, a back end side relative to the front end part of the sheet S is nipped by the pair of registration rollers 11. In the following description, the sheet in which the front end part is read by the reading unit 2 and the back end side relative to the front end part is nipped by the pair of registration rollers 11 is referred to as a target sheet S, and thus the target sheet is distinguished from the other sheets S.

In step S1, the control unit 4 determines, based on the image data for the target sheet S obtained by the reading performed by the reading unit 2, a displacement direction and a displacement amount of the target sheet S in the width direction relative to the target position as the displacement information. The control unit 4 determines the displacement information for the target sheet S before the target sheet S reaches the transfer position P3.

In step S2, the control unit 4 performs preparation processing for the displacement correction. As part of the preparation processing, the control unit 4 separates one conveyance roller of the second conveyance roller pair FR2 from the other conveyance roller. As part of the preparation processing, the control unit 4 accelerates the rotation of the first conveyance roller pair FR1. Here, the rotation speed of the first conveyance roller pair FR1 is higher than that of the pair of registration rollers 11. In this way, a warp occurs in the sheet S between the pair of registration rollers 11 and the first conveyance roller pair FR1 in the sheet conveyance direction.

In step S3, the control unit 4 moves the pair of registration rollers 11 in a direction opposite to the displacement direction indicated by the displacement information for the target sheet S only by the displacement amount indicated by the displacement information for the target sheet S from the home position in the width direction. After the pair of registration rollers 11 are moved in the direction opposite to the displacement direction indicated by the displacement information for the target sheet S only by the displacement amount indicated by the displacement information for the target sheet S from the home position in the width direction, the control unit 4 holds the pair of registration rollers 11 in that position.

Here, at the time when the movement of the pair of registration rollers 11 in the width direction in a state where the target sheet S is nipped is started, a warp occurs in the target sheet S between the pair of registration rollers 11 and the first conveyance roller pair FR1 in the sheet conveyance direction. Hence, even when the pair of registration rollers 11 are moved in the width direction in the state where the target sheet S is nipped by the pair of registration rollers 11, the target sheet S is prevented from being torn.

After the back end of the target sheet S is passed through the registration position P1, in step S4, the control unit 4 returns the pair of registration rollers 11 to the home position. The control unit 4 stops the rotation of the pair of registration rollers 11.

After the back end of the target sheet S is passed through the nip position of the first conveyance roller pair FR1, the control unit 4 returns the rotation speed of the first conveyance roller pair FR1 to the initial speed (that is, the speed before the preparation processing). After the back end of the target sheet S is passed through the nip position of the second conveyance roller pair FR2, the control unit 4 presses one conveyance roller of the second conveyance roller pair FR2 against the other conveyance roller.

<Correction Processing Based on Tendency of Displacement Direction and Displacement Amount of Sheet>

The home position of the pair of registration rollers 11 is corrected, and thus a displacement of the sheet S in the width direction may be suppressed. For example, when the sheet S tends to be displaced in one direction of the width direction, a correction for displacing the home position of the pair of registration rollers 11 in the other position opposite to the one direction of the width direction is previously performed, and thus the displacement of the sheet S may be reduced. When the displacement of the sheet S is reduced, it is possible to reduce, in the displacement correction, the amount of movement of the pair of registration rollers 11 in the width direction.

As another method, it can be considered that when the sheet S tends to be displaced in one direction of the width direction, the writing start position of the electrostatic latent image on the circumferential surface of the photosensitive drum 31 in the main scanning direction is previously displaced in the one direction. By this method, it is also possible to reduce, in the displacement correction, the amount of movement of the pair of registration rollers 11 in the width direction. Even if the effect of correcting the home position of the pair of registration rollers 11 is small, the writing start position of the electrostatic latent image in the main scanning direction is previously corrected, and thus it is possible to reduce, in the displacement correction, the amount of movement of the pair of registration rollers 11 in the width direction.

Hence, the control unit 4 performs correction processing based on the tendency of a displacement direction and a displacement amount of the sheet S (here, simply referred to as correction processing). In order to perform the correction processing, the control unit 4 determines tendency information indicating the tendency of a displacement direction and a displacement amount of the sheet S in the width direction relative to the target position. Then, the control unit 4 performs the correction processing based on the tendency information.

The flow of processing which is performed when the control unit 4 determines the tendency information will be described below with reference to a flowchart shown in FIG. 7. Here, the control unit 4 counts the number of sheets S which have been passed through the registration position P1 (hereinafter simply referred to as the number of sheets passed). Then, when the cumulative value of the number of sheets passed in the image forming apparatus 100 reaches a predetermined number of sheets, the control unit 4 determines the tendency information, and after the completion of a print job being performed at that time, the first correction processing is performed. Thereafter, each time the number of sheets passed reaches the predetermined number of sheets after the performance of the previous correction processing, the control unit 4 determines the tendency information, and after the completion of a print job being performed at that time, the correction processing is performed.

The predetermined number of sheets is not particularly limited, and ranges from several hundred sheets to tens of thousands of sheets. For example, the predetermined number of sheets is several thousand sheets. However, the predetermined number of sheets can be arbitrarily changed by the user. The operation panel 6 accepts a change of the predetermined number of sheets made by the user.

In step S11, the control unit 4 determines whether the number of sheets passed in the registration position P1 reaches the predetermined number of sheets. When the control unit 4 determines that the number of sheets passed does not reach the predetermined number of sheets, processing in step S11 is repeated. When the control unit 4 determines that the number of sheets passed reaches the predetermined number of sheets, the control unit 4 determines the tendency information. Specifically, the processing transfers to step S12. The control unit 4 performs, as processing for determining the tendency information, the processing in step S12 and the processing in step S13.

In step S12, the control unit 4 recognizes, for each of pieces of displacement information of the predetermined number of sheets determined most recently, which of one direction and the other direction opposite to the one direction corresponds to the displacement direction in the piece of the displacement information. Then, the control unit 4 determines, as the displacement direction in the tendency information, a majority-side displacement direction which is the one direction or the other direction having a majority. In other words, the control unit 4 determines the tendency of the displacement direction of the predetermined number of sheets S in the width direction relative to the target position. Furthermore, in other words, the control unit 4 determines in which of the one direction and the other direction of the width direction the sheet S is easily displaced.

In step S13, the control unit 4 extracts, from the pieces of displacement information of the predetermined number of sheets determined most recently, pieces of displacement information whose displacement directions are the majority-side displacement direction. The control unit 4 determines, as the displacement amount in the tendency information, the average value of displacement amounts in the pieces of displacement information which are extracted.

In step S14, the control unit 4 performs the correction processing based on the tendency information determined in steps S12 and S13. For example, when the number of sheets passed reaches the predetermined number of sheets while the print job is being performed, the control unit 4 does not perform the correction processing while the print job is being performed. The control unit 4 performs the correction processing after the completion of the print job being performed, and then performs the subsequent print job.

The control unit 4 performs, as the correction processing, at least one of first processing and second processing. The control unit 4 may perform only the first processing, may perform only the second processing or may perform both the first processing and the second processing. For example, the control unit 4 performs both the first processing and the second processing.

The control unit 4 displaces, as the first processing, the home position from the position before the performance of the first processing in a direction opposite to the displacement direction indicated by the tendency information only by the displacement amount indicated by the tendency information. The control unit 4 sets, for the subsequent print job, the home position to a position obtained by performing the correction based on the tendency information.

For example, it is assumed that the displacement direction in the tendency information is the one direction, and the displacement amount in the tendency information is 1 mm. In this case, the home position is displaced only 1 mm in the other direction of the width direction from the current position.

Then, in this example, it is assumed that a displacement of a certain sheet S in the width direction in the subsequent print job is 0.5 mm in the one direction. In this case, in the displacement correction of the sheet S, the pair of registration rollers 11 are moved only 0.5 mm in the other direction of the width direction. If the first processing for displacing the home position 1 mm in the other direction of the width direction is not performed, it is likely that the displacement of the sheet S in the width direction is 1.5 mm in the one direction, and thus the pair of registration rollers 11 need to be moved 1.5 mm in the other direction of the width direction.

The control unit 4 displaces, as the second processing, the writing start position of the electrostatic latent image on the circumferential surface of the photosensitive drum 31 in the main scanning direction from the position before the performance of the second processing in the displacement direction indicated by the tendency information only by the displacement amount indicated by the tendency information. The control unit 4 sets, for the subsequent print job, the writing start position of the electrostatic latent image on the circumferential surface of the photosensitive drum 31 in the main scanning direction to the position obtained by performing the correction based on the tendency information.

For example, it is assumed that the displacement direction in the tendency information is the one direction, and the displacement amount in the tendency information is 1 mm. Here, the edge position of the sheet S in the width direction when the edge position of the sheet S in the width direction is displaced 1 mm in the one direction of the width direction is referred to as a first edge position. When the edge position of the sheet S indicated by the tendency information is the first edge position, the writing start position of the electrostatic latent image on the circumferential surface of the photosensitive drum 31 in the main scanning direction is displaced only 1 mm in the one direction of the width direction from the current position.

In this example, even when in the subsequent print job, the edge position of the sheet S in the width direction is the first edge position, that is, even when it is determined that a displacement of the sheet S in the width direction occurs in the previous print jobs, it is determined that in the subsequent print job, a displacement of the sheet S in the width direction does not occur. In this way, even when the edge position of the sheet S in the width direction is the first edge position, the pair of registration rollers 11 do not need to be moved in the width direction (the displacement correction for the sheet S is not necessary).

If the edge position of the sheet S in the width direction is a second edge position which is displaced in the one direction relative to the first edge position, the displacement correction for the sheet S is performed. However, when in this example, both the first processing and the second processing are performed, it is considered that the home position is displaced in the other direction of the width direction, and thus the displacement amount of the sheet S in the one direction of the width direction is small.

In the present embodiment, at least one of the first processing and the second processing are performed, and thus it is possible to reduce the amount of movement of the pair of registration rollers 11 in the width direction when the displacement correction for the sheet S is performed. In this way, it is possible to suppress the occurrence of vibration, noise and the like caused by the movement of the pair of registration rollers 11 in the width direction. If the amount of movement of the pair of registration rollers 11 in the width direction is increased to prolong the convergence time of vibration, this affects the image quality. When as a measure for this problem, for example, the speed of the movement of the pair of registration rollers 11 in the width direction is lowered, it takes much time to perform the displacement correction for the sheet S, with the result that the productivity is degraded. Hence, the amount of movement of the pair of registration rollers 11 in the width direction when the displacement correction for the sheet S is performed is preferably low.

Figure 7:
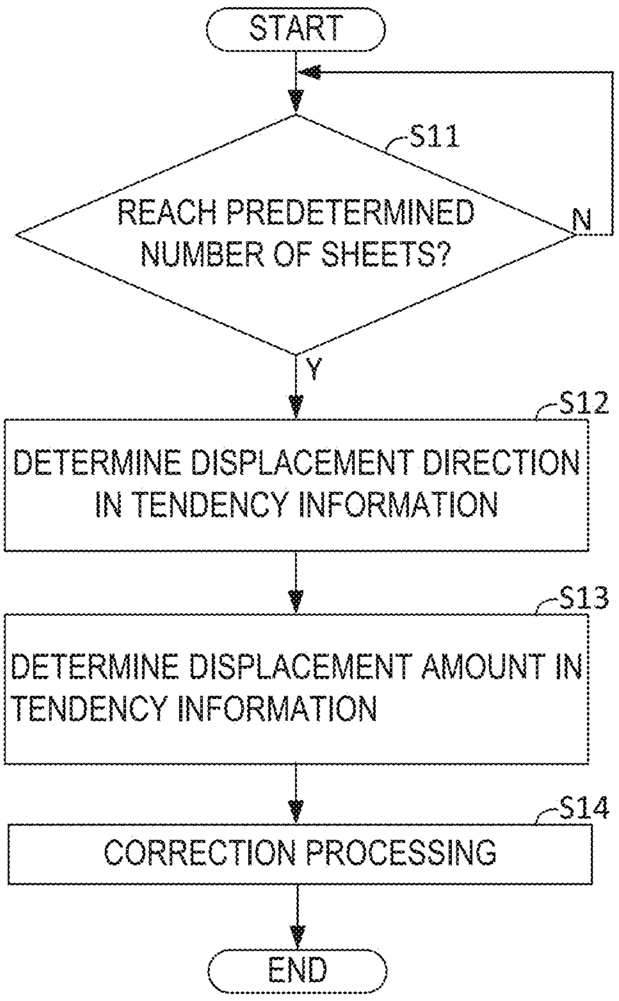
FIG. 7 is a flowchart showing correction processing based on tendency information which is performed by the control unit in the embodiment.

In the present embodiment, the processing along the flow shown in FIG. 7 is performed, and thus the tendency information is determined. In this way, it is possible to easily obtain the accurate tendency information.

<Adjustment of Warp Formation Time>

The control unit 4 performs warp adjustment processing. The warp adjustment processing is processing for adjusting the warp formation time. The warp formation time is a time in which a warp is formed in the sheet S in the registration position P1 (that is, the time after the sheet S reaches the registration position P1 until the rotation of the first conveyance roller pair FR1 and the second conveyance roller pair FR2 is stopped).

In order to determine whether the warp adjustment processing needs to be performed, the control unit 4 determines the average value of the amounts of skew of the predetermined number of sheets S. For example, when the tendency information is determined, the control unit 4 determines the average value of the amounts of skew of the predetermined number of sheets S determined most recently. In other words, when the determination is "yes" in step S11 of the flowchart shown in FIG. 7, in addition to the processing in step S12 and the processing in step S13, the control unit 4 determines the average value of the amounts of skew of the predetermined number of sheets S determined most recently.

Then, the control unit 4 determines whether the average value of the amounts of skew of the predetermined number of sheets S exceeds a predetermined threshold value. When the average value of the amounts of skew exceeds the threshold value, the control unit 4 performs the warp adjustment processing. On the other hand, when the average value of the amounts of skew is equal to or less than the threshold value, the control unit 4 does not perform the warp adjustment processing.

As the warp adjustment processing, the control unit 4 makes the warp formation time (that is, the time after the sheet S reaches the registration position P1 until the rotation of the first conveyance roller pair FR1 and the second conveyance roller pair FR2 is stopped) longer than the time before the warp adjustment processing is performed. The warp adjustment processing is performed, and thus the warp formation time is prolonged, with the result that the skew of the sheet S is easily corrected.

The upper limit value of the warp formation time is previously determined. In other words, even if the average value of the amounts of skew exceeds the threshold value, when the warp formation time has already reached the upper limit value, the control unit 4 does not perform the warp adjustment processing. When the average value of the amounts of skew is equal to or less than the threshold value in a state where the warp formation time is longer than the initial value (the warp formation time when the warp adjustment processing is not performed) due to the performance of the warp adjustment processing, the control unit 4 returns the warp formation time to the initial value.

It should be considered that the embodiment disclosed herein is illustrative in all respects and not restrictive. The scope of the present disclosure is indicated not by the description of the above embodiment but by the scope of claims, and meanings equivalent to the scope of claims and all changes within the scope are further included therein.

What is claimed is:

1. An image forming apparatus comprising:
- a pair of registration rollers that
  - can be moved in a width direction orthogonal to a sheet conveyance direction,
  - are rotatably supported,
  - are pressed against each other in a registration position,
  - are moved in the width direction to reach a predetermined home position before a sheet reaches the registration position and
  - nip the sheet which has reached the registration position and rotate to covey the sheet;
- an image formation unit that
  - performs scanning exposure on a member to be exposed to form an electrostatic latent image on the member to be exposed, thereafter develops the electrostatic latent image into a toner image and transfers the toner image to the sheet in a transfer position on a downstream side in the sheet conveyance direction relative to the registration position;

a roller movement mechanism that moves the pair of registration rollers in the width direction;

a detection unit that detects a position of the sheet in the width direction in a detection position between the registration position and the transfer position in the sheet conveyance direction; and a control unit that individually performs a displacement correction on the sheet, the displacement correction being performed by determining, before a target sheet which is the sheet nipped by the pair of registration rollers reaches the transfer position, based on position data of the target sheet obtained by the detection performed by the detection unit, a displacement direction and a displacement amount relative to a target position of the target sheet in the width direction as displacement information, and moving, from the home position, the pair of registration rollers in a direction opposite to the displacement direction indicated by the displacement information only by the displacement amount indicated by the displacement information, wherein the control unit determines, based on pieces of the displacement information of a predetermined number of the sheets that have been passed through the registration position, tendency information indicating a tendency of the displacement direction and the displacement amount relative to the target position of the sheet in the width direction, and performs at least one of first processing and second processing based on the tendency information, the control unit displaces, as the first processing, the home position from a position before the performance of the first processing in a direction opposite to the displacement direction indicated by the tendency information only by the displacement amount indicated by the tendency information and the control unit displaces, as the second processing, a writing start position of the electrostatic latent image in a main scanning direction from a position before the performance of the second processing in the displacement direction indicated by the tendency information only by the displacement amount indicated by the tendency information.

2. The image forming apparatus according to claim 1, wherein when at least one of the first processing and the second processing are performed, the control unit recognizes, for each of the pieces of the displacement information of the predetermined number of the sheets, which of one direction and an other direction opposite to the one direction corresponds to the displacement direction in the piece of the displacement information, determines, as the displacement direction in the tendency information, a majority-side displacement direction that is the one direction or the other direction having a majority and determines, among the pieces of the displacement information of the predetermined number of the sheets, as the displacement amount in the tendency information, an average value of displacement amounts in pieces of the displacement information whose displacement directions are the majority-side displacement direction.

3. The image forming apparatus according to claim 1, wherein the control unit performs both the first processing and the second processing.

4. The image forming apparatus according to claim 1, further comprising:

an upstream-side roller member that makes contact with the sheet to rotate in a position on an upstream side in the sheet conveyance direction relative to the registration position so as to convey the sheet toward the registration position, wherein when the sheet reaches the registration position, the rotation of the pair of registration rollers is stopped whereas the upstream-side roller member is rotated, and after the sheet reaches the registration position, the rotation of the upstream-side roller member is stopped such that skew of the sheet is corrected, the control unit determines an amount of skew of the sheet based on the position data of the sheet obtained by the detection performed by the detection unit and when an average value of amounts of skew of the predetermined number of the sheets exceeds a predetermined threshold value, the control unit performs warp adjustment processing such that a time after the sheet reaches the registration position until the rotation of the upstream-side roller member is stopped is made longer than the time before the warp adjustment processing is performed.

* * * * *